(No Model.) 6 Sheets—Sheet 1.

C. E. MOORE.
MACHINE FOR POINTING AND FINISHING HORSESHOE NAILS.

No. 470,321. Patented Mar. 8, 1892.

Witnesses. Inventor.

(No Model.) 6 Sheets—Sheet 2.

C. E. MOORE.
MACHINE FOR POINTING AND FINISHING HORSESHOE NAILS.

No. 470,321. Patented Mar. 8, 1892.

WITNESSES. INVENTOR.
Henry March. Charles E. Moore
Harry W. Aiken. by F. E. Teschemacher
Atty.

(No Model.) 6 Sheets—Sheet 3.
C. E. MOORE.
MACHINE FOR POINTING AND FINISHING HORSESHOE NAILS.
No. 470,321. Patented Mar. 8, 1892.
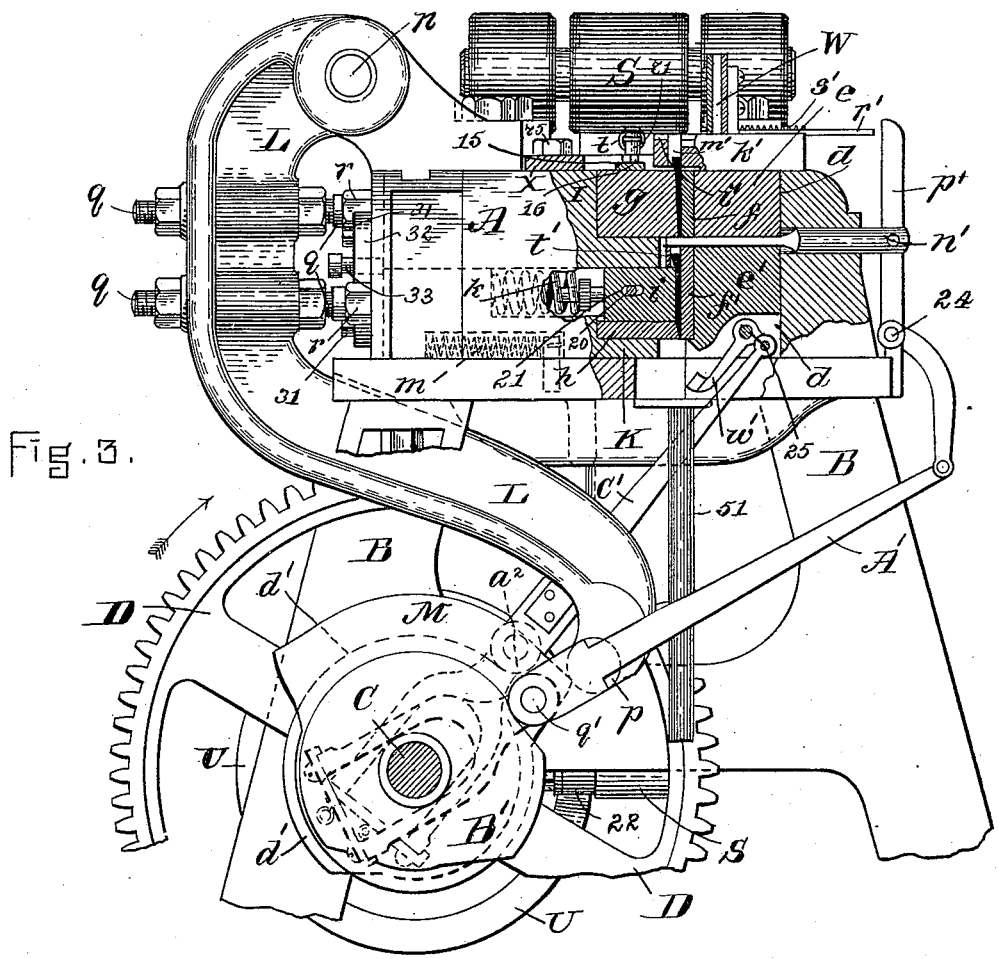
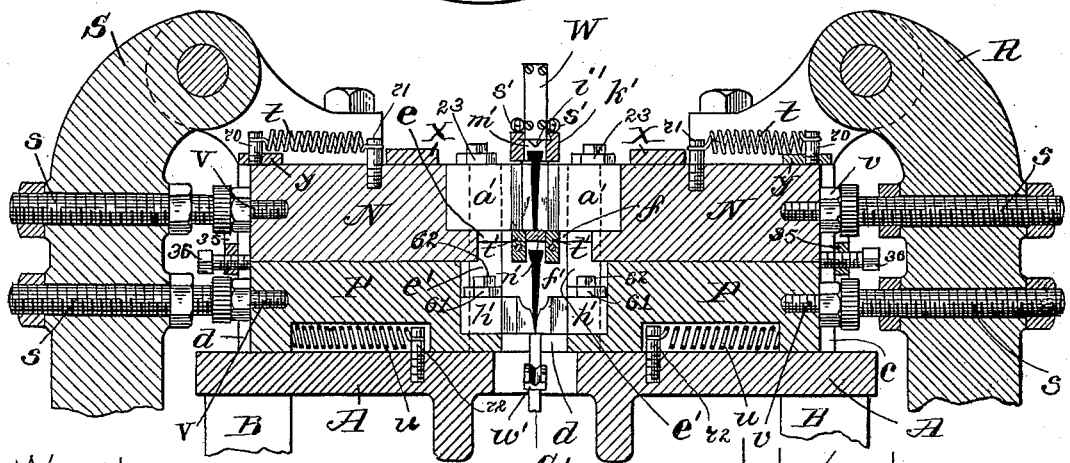
Witnesses: T. Henry Marsh. Harry T. Aiken.
Inventor: Charles E. Moore, by P. E. Teschemacher, Atty.
THE NORRIS PETERS CO., PHOTO-LITHO., WASHINGTON, D. C.

(No Model.) 6 Sheets—Sheet 4.
C. E. MOORE.
MACHINE FOR POINTING AND FINISHING HORSESHOE NAILS.
No. 470,321. Patented Mar. 8, 1892.
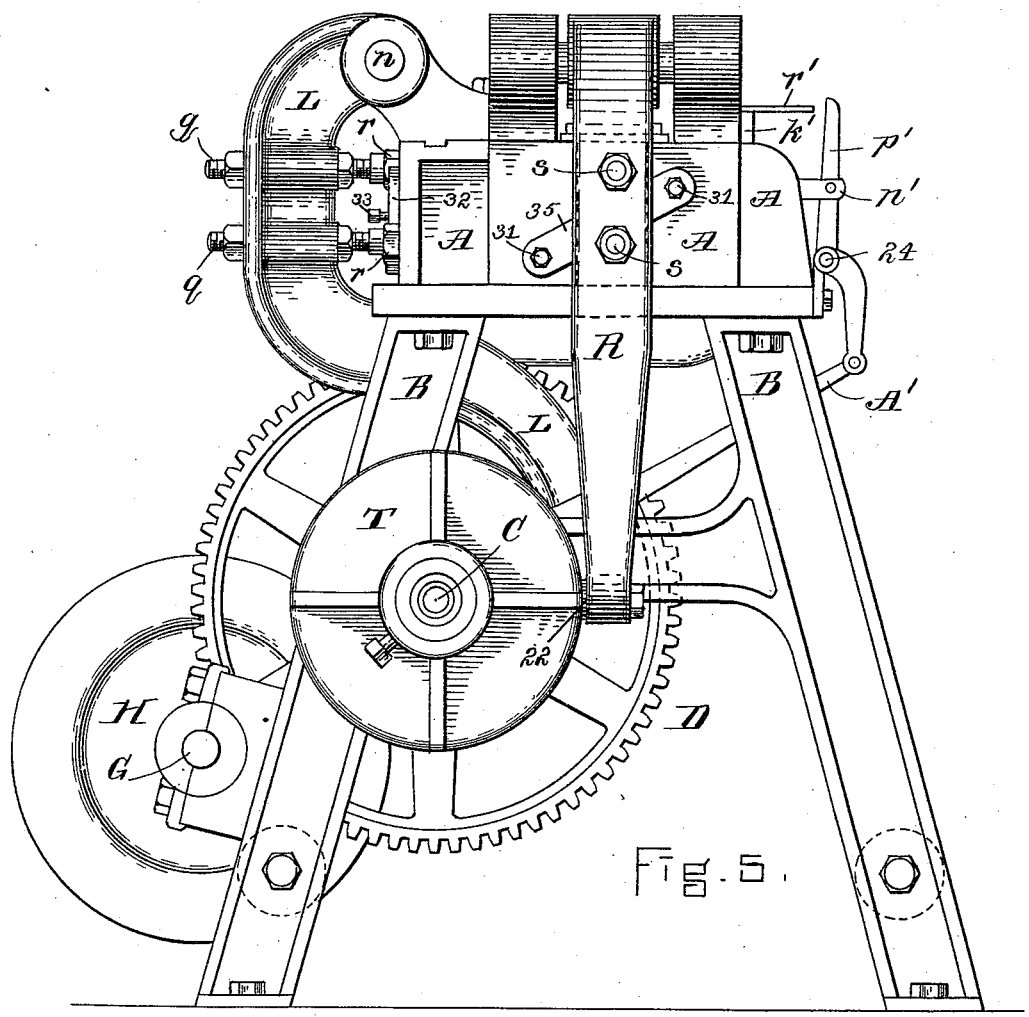
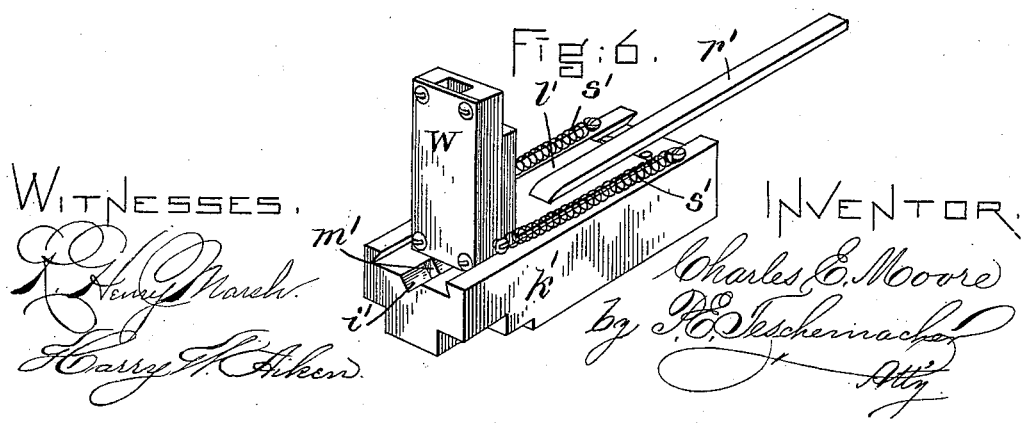
Witnesses. Inventor.
Charles E. Moore
by P. E. Teschemacher
Atty (No Model.) 6 Sheets—Sheet 5.
C. E. MOORE.
MACHINE FOR POINTING AND FINISHING HORSESHOE NAILS.

No. 470,321. Patented Mar. 8, 1892.

WITNESSES
Henry Marsh.
Harry H. Aiken.

INVENTOR.
Charles E. Moore
by F. E. Teschemacher
Atty.

(No Model.) 6 Sheets—Sheet 6.

C. E. MOORE.
MACHINE FOR POINTING AND FINISHING HORSESHOE NAILS.

No. 470,321. Patented Mar. 8, 1892.

WITNESSES.
Henry Marsh
Harry W. Aiken

INVENTOR.
Charles E. Moore
by F. Teschemacher
Atty

THE NORRIS PETERS CO., PHOTO-LITHO., WASHINGTON, D. C.

UNITED STATES PATENT OFFICE.

CHARLES E. MOORE, OF BOSTON, MASSACHUSETTS, ASSIGNOR TO ANN M. PUTNAM, OF SAME PLACE, AND GEORGE N. FLETCHER, OF DETROIT, MICHIGAN.

MACHINE FOR POINTING AND FINISHING HORSESHOE-NAILS.

SPECIFICATION forming part of Letters Patent No. 470,321, dated March 8, 1892.

Application filed May 27, 1891. Serial No. 394,298. (No model.)

*To all whom it may concern:*

Be it known that I, CHARLES E. MOORE, a citizen of the United States, residing at Boston, in the county of Suffolk and State of Massachusetts, have invented certain Improvements in Machines for Pointing and Finishing Horseshoe-Nails, of which the following is a full, clear, and exact description, reference being had to the accompanying drawings, making part of this specification, in which—

Figures 1, 9:
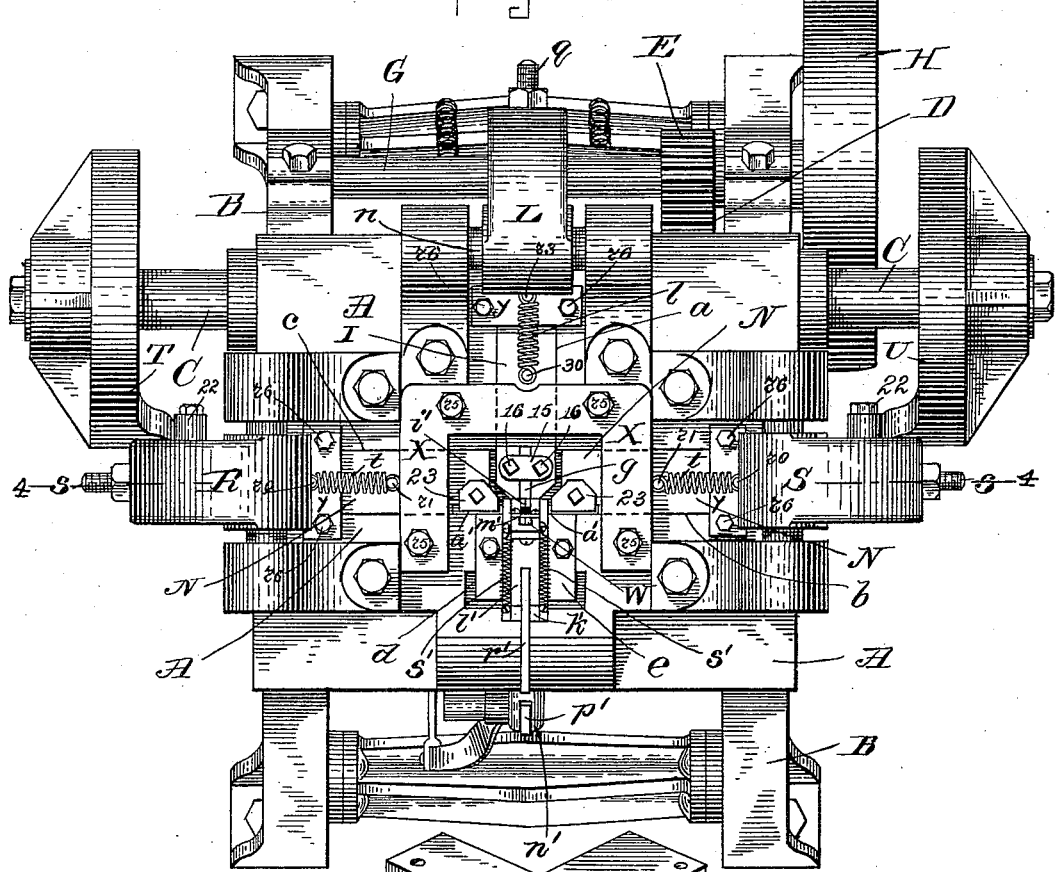
Figure 2:
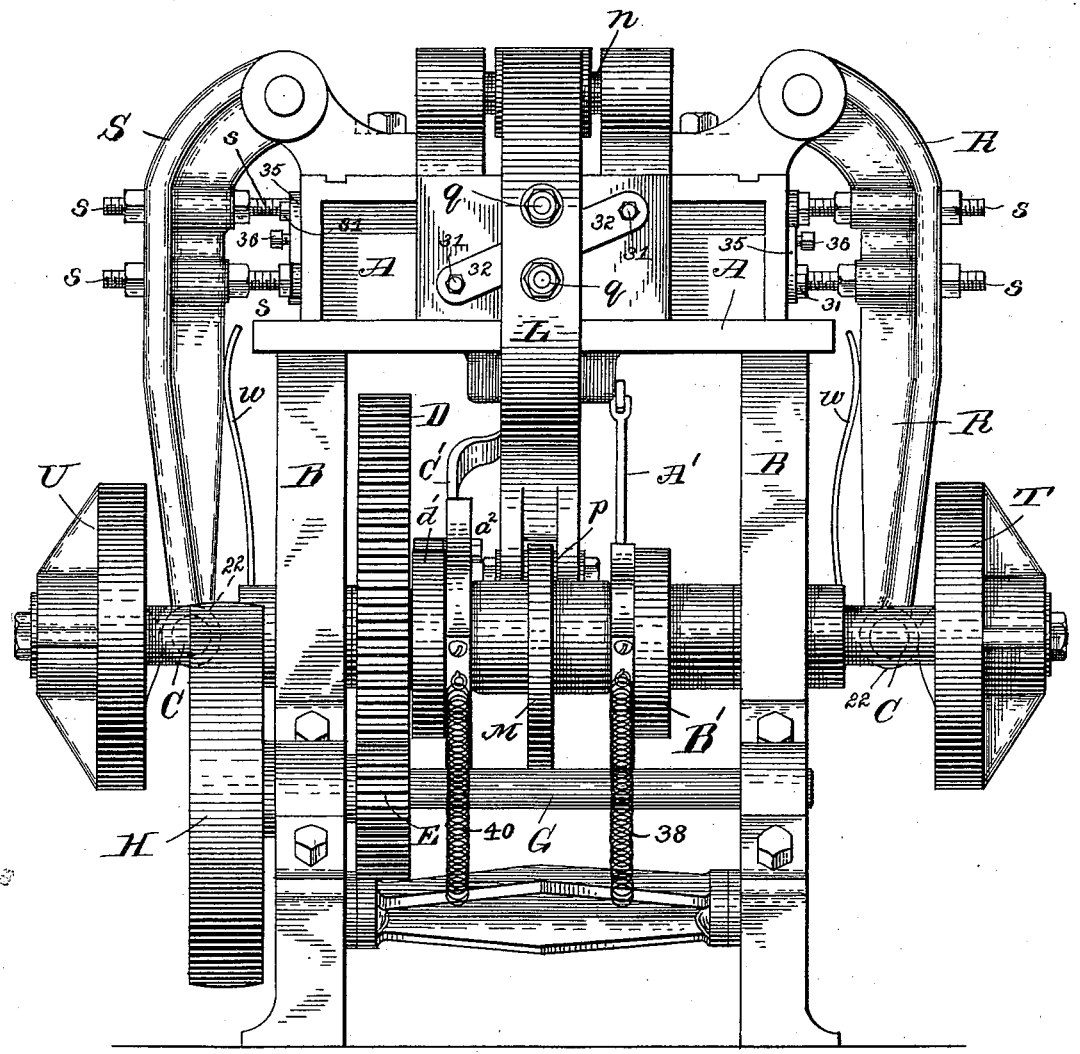
Figure 10:
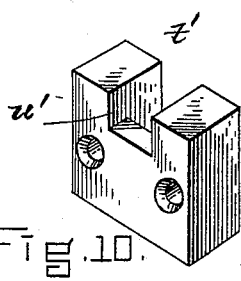
Figure 7:
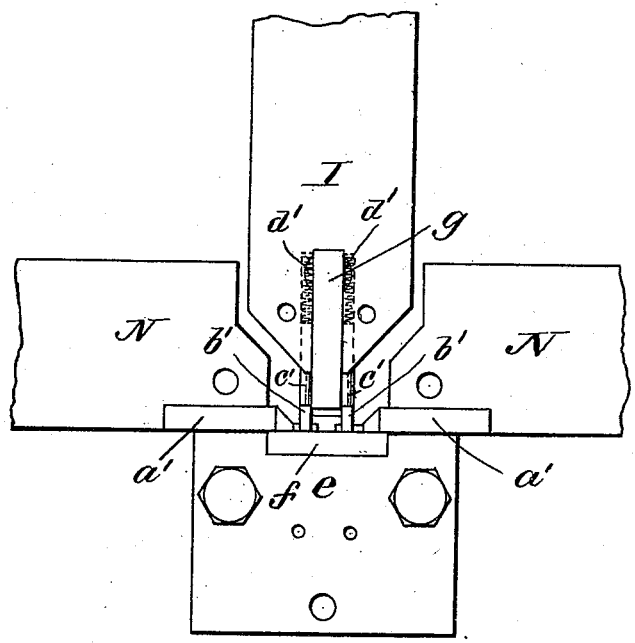
Figure 8:
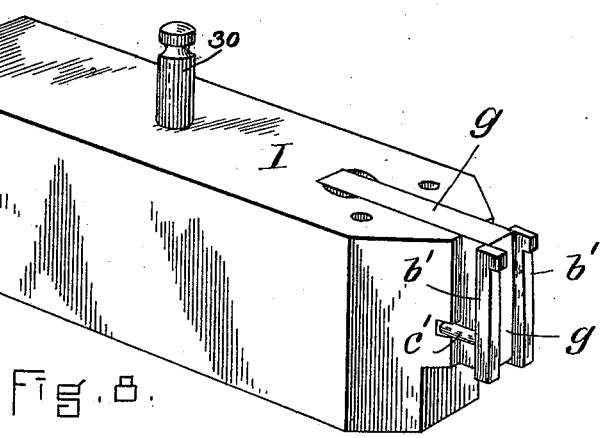
Figure 11:
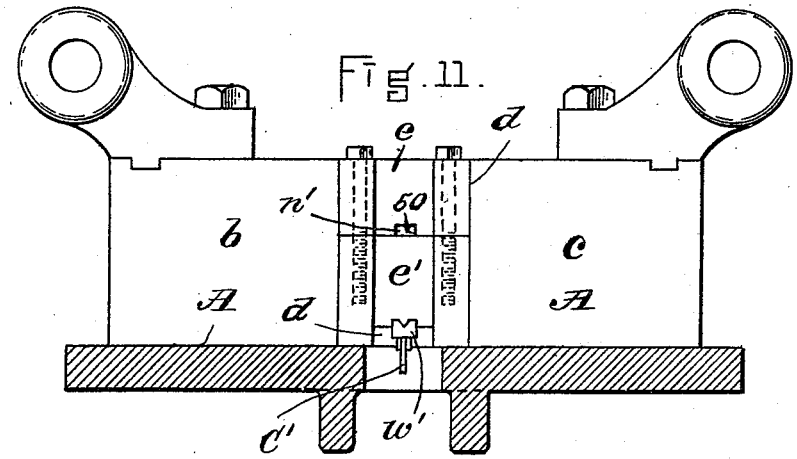
Figure 12:
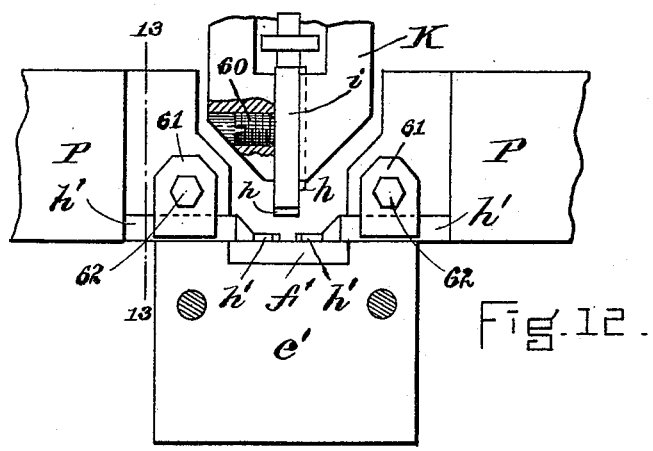
Figure 13:
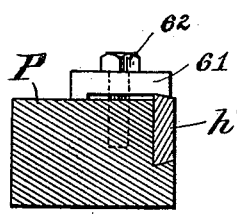
Figure 14:
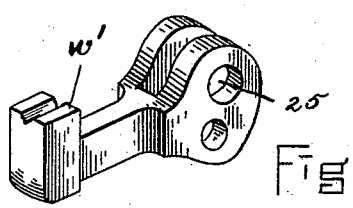

Figure 1 is a plan of a machine for pointing and finishing horseshoe-nails, constructed in accordance with my invention. Fig. 2 is a rear elevation of the same. Fig. 3 is an enlarged sectional side elevation of the same. Fig. 4 is a vertical section on the line 4 4 of Fig. 1. Fig. 5 is a side elevation. Fig. 6 is a detail in perspective of the nail-conductor and its slide. Fig. 7 is an enlarged plan of the straightening-dies and their sliding carrying-blocks. Fig. 8 is a perspective view of the front upper die-carrying block and die, showing the movable guide-pieces on each side of the die. Fig. 9 is a perspective view of the bed-plate of the machine. Fig. 10 is a detail to be referred to. Fig. 11 is a sectional detail to be referred to. Fig. 12 is an enlarged plan of the pointing-dies and their sliding carrying-blocks. Fig. 13 is a vertical section on the line 13 13 of Fig. 12. Fig. 14 is an enlarged perspective view of the lower nail-stop.

My invention has for its object to improve the construction of machines for pointing and finishing horseshoe-nails, whereby the work can be performed more rapidly and perfectly than heretofore; and to this end my invention consists in a machine embodying certain novel combinations of parts and details of construction, as hereinafter set forth and specifically claimed.

In the said drawings, A represents the bed of the machine supported on a suitable framework B, having bearings in which runs the main or cam shaft C, carrying a large gear D, with which meshes a pinion E on the driving-shaft G, provided at one end outside the frame-work with a heavy balance-wheel or pulley H, adapted to be driven by a belt. (Not shown.)

The bed A, which approximates in form to a cross, is provided with deep recesses or ways *a b c*, the ways *b c* being arranged at right angles to the way *a* and extending out through the sides of the bed, as seen in Figs. 1 and 9. Opposite to the front end of the recess or way *a* is formed a deep recess *d* for the reception of the blocks *e e'*, in which are fitted two removable steel plates *f f'*, forming upper and lower stationary dies for supporting the back of the nail while being straightened and pointed, as hereinafter described. Within the way *a* are placed, one over the other, two horizontally-sliding blocks I K, the former I carrying the upper front die *g*, which straightens the nail on the front side, while the latter K carries the lower die *h*, which points the front side of the nail with the usual bevel. The die *g* fits within a narrow recess in the block I, as seen in Figs. 1 and 8, and is securely held in place therein by a plate 15 and screw-bolts 16. The lower die *h* is secured within a narrow recess in the block K by a screw 60, as seen in Fig. 12. The lower slide K also carries immediately above the die *h* a narrow yielding clamp *i*, which fits within a recess in said slide and is normally projected beyond the die *h* by a spring *k*, placed in a recess behind it, said clamp, which is held in place within its recess in the block K by a pin 20, passing through a slot 21, serving to hold the nail firmly in position while being pointed. The sliding blocks I K are moved toward the stationary dies *f f'* against the stress of their respective springs *l m* by a heavy curved lever L, pivoted at *n* between ears or lugs rising from the bed A, and carrying at its end an anti-friction roll *p*, which is acted upon by a cam M on the cam-shaft C. The lever L is provided near its upper end with two adjustable bolts *q q*, the heads of which bear against the heads of bolts or pins *r r*, projecting from the slides I K, whereby as the lower end of the lever is raised by the cam M the slides are forced inward to cause the dies *g h* and clamp *i* secured thereto to operate as desired. As the raised portion of the cam M passes off the roll at the lower end of the lever L the latter drops by gravitation, thus retracting the bolts *q q*, when the springs *l m* will return the slides I K to their normal positions. The bolts *q q* of the lever L can be adjusted to take up any wear of the dies, or to adapt them for nails of different sizes or thicknesses, or to cause said dies to act with more or less pressure upon the nails being straightened and pointed, and the bolts *r r* when worn can be easily removed and replaced by new ones. The spring *m*, which retracts the lower slide K, fits within a recess in its under side, as seen dotted in Fig. 3, one end bearing against the slide and the other end being attached to a pin projecting up from the bed A, and the spring *l*, which retracts the upper slide, is secured at one end to a stationary pin 73, and at the other end to a pin 30, projecting from the top of said slide. Across the rear end of the way *a* is secured by screws 31 a plate 32, through which passes an adjusting-screw 33, adapted to bear against the ends of both of the blocks or slides I K, as seen dotted in Fig. 3, forming a stop, whereby the distance which said slides are moved backward by their springs *l m* may be regulated, as desired, to leave a proper-sized opening between the movable and stationary dies for nails of different sizes.

Within each of the lateral ways *b c* are fitted to slide horizontally therein two blocks N P, similar to the blocks I K, and adapted to be moved inward toward each other by two levers R S, pivoted at their upper ends to ears or lugs on the bed A, and carrying at their lower ends anti-friction rolls 22, which are acted upon by cam-wheels T U, secured to the opposite ends of the cam-shaft C outside the frame-work. These levers, like the lever L, are provided with adjustable bolts *s s*, the heads of which bear against bolts *v*, projecting from the outer ends of the slides N P, which are thus moved forward against the stress of suitable springs *t u*, by which the slides are carried back as their levers are moved outward by springs *w w*, which serve to keep the rolls 22 in contact with the cams. The bolts *s s* are made adjustable in the same manner as the bolts *q q* of the lever L and for a similar purpose. Across the outer end of the ways *b c* is secured a plate 35, through which passes an adjusting-screw 36, which bears against the outer ends of the two slides N P in said way, as seen in Fig. 4, whereby their outward range of movement may be regulated, as desired, to leave a space of proper width between the side dies for nails of different sizes. The springs *t t*, which retract the upper slides N N, are each secured at one end to a stationary pin 70 and at the other end to a pin 71, projecting up from the slide N, and the springs *u u* of the lower slides P P are each secured within a recess in the slide, one end of the spring bearing against the slide, and the other end being attached to a pin 72, projecting up from the bed A, as seen in Fig. 4. The two upper sliding blocks N N carry the side-straightening dies *a' a'*, which serve to straighten the sides of the nail before it drops down into position to be acted upon by the lower or pointing dies. These dies *a' a'* are immovably secured in narrow recesses in the blocks N N by suitable fastening devices 23, and are beveled at their ends to permit the front-straightening die *g* to come into contact with the nail, and on each side of the front-straightening die *g* and in contact therewith is arranged a vertical guide-piece *b'*, supported on a rod *c'*, as seen in Figs. 7 and 8, said rod sliding in a horizontal recess or aperture in the block I, and bearing at its inner end against a spring *d'*, (seen dotted in Fig. 7,) contained in said recess, by which construction the guide-pieces *b' b'* are permitted to yield on coming into contact with the stationary die *f*. The guide-pieces *b' b'* serve to close the openings between the side-straightening dies *a' a'* and the front-straightening die *g* when said dies are drawn back, thus preventing the nail, as it drops, from being caught between these dies, and in this manner a straight unobstructed channel is formed, through which the nail can pass to the lower or pointing dies, leaving no projection or corner for the nail to accidentally catch on as it drops. The two lower sliding blocks P P carry the side-pointing dies *h' h'*, which are secured within recesses in the ends of the blocks by clamping-plates 61 and screws 62, as seen in Figs. 12 and 13, and co-operate with the front pointing-die *h*, the faces of these dies being inclined or beveled to give the proper shape to the point of the nail. The blocks N N are cut away and properly shaped at their ends, as shown in Fig. 7, to leave a space or passage between them of sufficient width to permit the block I, beveled on each side, as shown, to be moved forward sufficiently to enable its die to act upon the nail, the lower sliding blocks P P K being similarly shaped at their ends, as seen in Fig. 12, for the same purpose, and by this construction the die-carrying blocks are prevented from interfering with each other as they are advanced to cause their dies to be brought into contact with the nails. The die-carrying slides or blocks are all held down in place within their ways by an angle-plate X, extending over the front ends of the upper slides I N N and secured to the bed A by screws 75, the rear ends of said slides being held down by smaller plates *y*, extending across the rear ends of the upper slides I N N, as seen in Fig. 1, and secured to the bed A by screws 76.

W is a conductor adapted to receive the nails to be straightened and pointed, said nails being dropped into the conductor one at a time with the head uppermost, and with the straight side or back toward the front of the machine, as seen in Fig. 3, the point of the nail resting in a V-shaped groove *i'*, formed in a block *k'*, secured to the block *e*. The conductor W is attached to a plate *l'*, sliding in a dovetail groove or way formed in the upper side of the block $k'$, as seen in Figs. 1 and 6, and when moved forward to bring it over an aperture $m'$ in the block $k'$ the nail drops down therethrough into the space or channel between the dies $f$ $g$ and guide-pieces $b'$ $b'$ until arrested by its point striking a sliding stop $n'$ fitting within a groove 50 in the under side of the block $e$, (shown in Fig. 11,) the outer end of said stop being pivoted to the upper end of a lever $p'$, fulcrumed at 24, and having pivoted to its lower end a rod $A'$, bifurcated at its lower end to embrace the cam-shaft C, by which it is supported, and carrying an anti-friction roll $q'$, which is acted upon by a cam $B'$ on said shaft C to move the rod $A'$ against the resistance of a retracting-spring 38, by which the roll $q'$ is kept constantly in contact with the cam, said cam being properly shaped to impart the necessary movement to the lever $p'$, to advance the stop $n'$ at the required time, the spring 38 serving to withdraw the stop when permitted to do so by the cam $B'$. The plate $l'$ with the conductor W is advanced to bring the nail over the aperture $m'$ by the contact of the upper end of the lever $p'$ with a bar $r'$, secured to the plate $l'$, which is thus moved the required distance against the stress of springs $s'$ $s'$, Figs. 1 and 6, by which the parts are returned to their normal positions when the upper end of the lever $p'$ recedes, and as the end of the lever $p'$, which acts on the bar $r'$, has a greater range of movement than is required for the conductor W, the upper end of the said lever, when drawn back to its full extent, is removed from contact with the outer end of the bar $r'$, as seen in Figs. 1, 3, and 5.

In the intermediate space between the bottoms of the upper or straightening dies and the tops of the lower or pointing dies is fitted a guide-piece $t'$, Fig. 10, which is secured by countersunk screws to the die $f'$, and is cut away on one side to form an opening of sufficient size to allow of the passage of the nail, whereby a continuous straight channel without break or interruption is formed for the passage of the nail from the top of the conductor (when over the aperture $m'$) to the bottom of the lower or pointing dies, preventing the nail from dropping loosely, and insuring its descent in a vertical direction. The top of the guide-piece $t'$ is cut away at $u'$ to allow of the passage of the sliding stop or catch $n'$, which is thus enabled to pass under the upper dies and hold the nail until it is caught and squeezed between the dies $g$ $f$. On the withdrawal of the stop $n'$, the nail, after having been operated upon by the front and side straightening dies, drops down into a position to be operated upon by the lower or pointing dies, where it is caught and held by a lower stop or catch $w'$, said catch consisting of a bell-crank lever pivoted at 25 in a recess formed within the block $e'$ and having its shorter arm connected with a rod $C'$, bifurcated at its lower end to embrace the cam-shaft C, by which it is supported, and carrying an anti-friction roll $a^2$, which is acted upon by a cam $d'$ on said shaft C to move the rod $C'$ against the stress of a spring 40, by which the roll $a^2$ is kept constantly in contact with the cam, said cam being properly shaped to cause the stop or catch $w'$ to be withdrawn at the proper time, the spring 40 serving to advance the stop when permitted to do so by the cam $d'$. The end of the lever $w'$, which forms the stop to prevent the point of the nail from extending below the die is provided with a V-shaped groove, as seen in Figs. 4, 11, and 14, to center the point of the nail and insure its being held in the proper position while being pointed, and this stop $w'$ is withdrawn before the die $h$ is brought into contact with the nail, so as to be out of the way of said die, the stop being no longer required to support the nail after it has been gripped by the clamp $i$, which holds it firmly in place while being pointed. The stop $n'$ is withdrawn soon after the dies have receded sufficiently to allow the nail to drop onto the lower stop or catch $w'$, which is brought up, as seen in Fig. 11, just previous to the withdrawal of the stop $n'$ to hold the nail while being pointed, after which the stop $n'$ is immediately advanced by the return movement of the lever $p'$, which simultaneously moves forward the conductor W over the aperture $m'$ when another nail drops onto the stop $n'$, two nails being now in the machine, as seen in Figs. 3 and 4, which are operated upon simultaneously, the upper one being straightened at the same time that the lower one is being pointed, the machine being thus enabled to perform its work with increased rapidity and in a perfect and reliable manner. The sliding blocks K P P of the lower or pointing dies being farther removed from the fulcra of the levers L R S than the sliding blocks I N N of the upper or straightening dies, it will be obvious that the pointing-dies will recede faster or a little in advance of the straightening-dies, and consequently the lower nail will be released in time to drop out of the machine and permit the lower stop $w'$ to be brought up to its place before the upper nail is released and allowed to drop by the withdrawal of the stop $n'$.

The operation of the machine is as follows: A nail having been dropped into the conductor W with its point resting in the V-shaped groove $i'$ of the block $k'$, said block is moved forward by the contact of the lever $p'$ with the bar $r'$ until the conductor is directly over the aperture $m'$, when the nail will drop down between the straightening-dies until its point comes into contact with the stop $n'$, which has been advanced by the inward movement of the lever $p'$. The front-straightening die $g$ then advances and forcibly compresses or squeezes the nail against the front stationary die $f$, and while still held between said dies the side-straightening dies are advanced, gripping the nail between them and straightening it perfectly, as required. On the withdrawal of the stop $n'$, after the straightening-dies have completed their work and receded, the nail drops down onto the lower stop $w'$, which is brought up at that time to catch the nail, immediately after which the stop $n'$ is returned to its original position, and a moment thereafter the conductor W arrives over the aperture $m'$ and another nail drops onto the stop $n'$ and is ready to be straightened, as previously described. There are now two nails in the machine, as seen in Figs. 3 and 4, and as the slides I K are simultaneously advanced by the lever L, the clamp $i$ holds the lower nail firmly against the lower front stationary die $f'$, the spring $k$ permitting the clamp $i$ to yield as the slide K advances with the lower pointing-die $h$, which is now brought forcibly in contact with the nail to form the bevel on the front side of the point. The slide K, with the die $h$, then recedes a short distance, but not sufficiently to relieve the nail of the pressure of the spring holding-clamp $i$, which is pressed forward by its spring $k$ as the block K recedes. The side-pointing dies now advance and act on the nail to form the sides of the point, after which they recede to their orignal positions, and immediately thereafter the front die $h$ is again advanced to act a second time upon the nail, which completes the operation and gives it a sharp and perfectly-formed point. The second advance of the die $h$ is produced by making the cam M of the proper shape to effect this movement. The die $h$ is then entirely drawn back, as is also the clamp $i$, and the stop $w'$ having been withdrawn, as previously described, before the first operation of the die $h$, the finished nail drops through a conducting-tube 51 onto the floor or into a receptacle placed to receive it. The stop $w'$ is then instantly thrown up to catch the upper nail, which is now released by the withdrawal of the stop $n'$, and on the return of the latter and the advance of the conductor W another nail drops from the aperture $m'$ onto the stop $n'$ and the operation continues, as before described, two nails being always in the machine at the same time, the upper one being straightened while the lower one (previously straightened) is at the same time being pointed.

What I claim as my invention, and desire to secure by Letters Patent, is—

1. In a machine for pointing and finishing horseshoe-nails, the sliding blocks I K, arranged one beneath the other and provided the former with the straightening-die $g$ and the latter with the yielding clamp $i$ and pointing-die $h$, arranged immediately beneath the said clamp, and the lever L and springs $l\ m$ for actuating said sliding blocks, said lever operated by a cam, as described, combined with the laterally-sliding blocks N N P P, provided with the side-straightening dies $a'\ a'$ and side-pointing dies $h'\ h'$ and the levers R S and springs $t\ u$ for operating the said sliding blocks, said levers R S being actuated by cams and springs, as described, the stationary dies $f f'$, the upper and lower stops $n'\ w'$, adapted to intercept the nails, respectively, at the proper levels to be acted upon by the said straightening and pointing dies, and the conductor W, all operating substantially in the manner and for the purpose described.

2. In a machine for pointing and finishing horseshoe-nails, the combination, with the straightening-dies and the pointing-dies arranged beneath the straightening-dies in line therewith, said dies being adapted to operate simultaneously on two different nails, of the guide-piece $t'$, placed in the space between the bottoms of the straightening-dies and the tops of the pointing-dies and adapted to guide the nail and insure its descent in a vertical direction, substantially as set forth.

3. In a machine for pointing and finishing horseshoe-nails, the combination, with the sliding block I and the straightening-die $g$, secured thereto and projecting beyond the front end thereof, of the guide-pieces $b'\ b'$, mounted on backwardly-yielding supports and arranged to slide on opposite sides of the die $g$ and projecting normally beyond its working face, said guide-pieces being adapted to be brought into contact with the stationary die $f$ and be pressed backward thereby as the die $g$ advances, substantially as set forth.

4. In a machine for pointing and finishing horseshoe-nails, the combination, with the block $k'$, having the V-shaped groove $i'$ and aperture $m'$, of the sliding plate $l'$, provided with the conductor W and bar $r'$, and means for actuating said slide and conductor, consisting, essentially, of the lever $p'$, connecting-rod A', actuated by a cam and spring, and the springs $s'$ for retracting the slide on the withdrawal of the lever $p'$, all operating substantially as set forth.

5. In a machine for pointing and finishing horseshoe-nails, the combination, with the straightening and pointing dies, as described, and the upper stop $n'$, of the lower stop $w'$, consisting of a bell-crank lever provided with a V-shaped centering-groove at its outer end for holding the nail in position to be gripped by the clamp $i$, and the rod C' and its actuating cam and spring, all operating substantially as described.

Witness my hand this 23d day of May, A. D. 1891.

CHARLES E. MOORE.

In presence of—
P. E. TESCHEMACHER,
HARRY W. AIKEN.